United States Patent [19]

Uehara et al.

[11] Patent Number: 5,663,772
[45] Date of Patent: Sep. 2, 1997

[54] GRAY-LEVEL IMAGE PROCESSING WITH WEIGHTING FACTORS TO REDUCE FLICKER

[75] Inventors: Hirotoshi Uehara; Shoichi Gotoh; Norio Aoki, all of Osaka, Japan

[73] Assignee: Matsushita Electric Industrial Co., Ltd., Kadoma, Japan

[21] Appl. No.: 410,877

[22] Filed: Mar. 27, 1995

[30] Foreign Application Priority Data

Mar. 29, 1994 [JP] Japan ................... 6-058647

[51] Int. Cl.⁶ ...................................... H04N 5/14
[52] U.S. Cl. ................ 348/671; 345/147; 358/458; 382/162
[58] Field of Search ................... 348/671, 672, 348/673, 675, 679, 683, 910, 571; 358/432, 433, 429, 455, 456, 460, 534, 535, 458; 345/136, 147, 148; 382/162, 237; H04N 5/14

[56] References Cited

U.S. PATENT DOCUMENTS

| | | | |
|---|---|---|---|
| 4,454,506 | 6/1984 | Netravali et al. | 340/728 |
| 4,771,275 | 9/1988 | Sanders | 340/703 |
| 4,785,818 | 11/1988 | Hardin | 358/112 |
| 4,827,255 | 5/1989 | Ishii | 345/148 |
| 4,849,746 | 7/1989 | Dubner | 340/728 |
| 5,189,530 | 2/1993 | Fujii | 358/458 |
| 5,196,839 | 3/1993 | Johary et al. | 340/793 |
| 5,313,287 | 5/1994 | Barton | 358/458 |
| 5,341,224 | 8/1994 | Eschbach | 358/458 |
| 5,506,699 | 4/1996 | Wong | 358/458 |

FOREIGN PATENT DOCUMENTS 61232787  12/1992  Japan.

OTHER PUBLICATIONS

Warnock, Proceeding of the Conference Siggraph'80, pp. 302–307, 1980, "The Display of Characters Using Gray Level Sample Arrays."

Negroponte, Proceeding, Society for Information Display, 1980, "Soft Fonts."

*Primary Examiner*—John K. Peng
*Assistant Examiner*—Chris Grant
*Attorney, Agent, or Firm*—Renner, Otto, Boisselle, Sklar

[57] ABSTRACT

According to a method and a system of the present invention, a gray-level data is generated from a binary image while reducing the vertical brightness transition, and a display with a reduced flicker is enabled in an interlaced scanning system. A filtering operation is conducted with respect to each of the pixels in a dot matrix by using the data of each pixel and the dot matrix data of the pixel adjacent to the pixel in a vertical direction, thereby generating a gray-level data and writing the data into a frame memory. A display with a reduced flicker may be conducted by transforming the gray-level data into a predetermined set of colors consisting of a foreground color, a background color, and an intermediate color thereof.

20 Claims, 11 Drawing Sheets

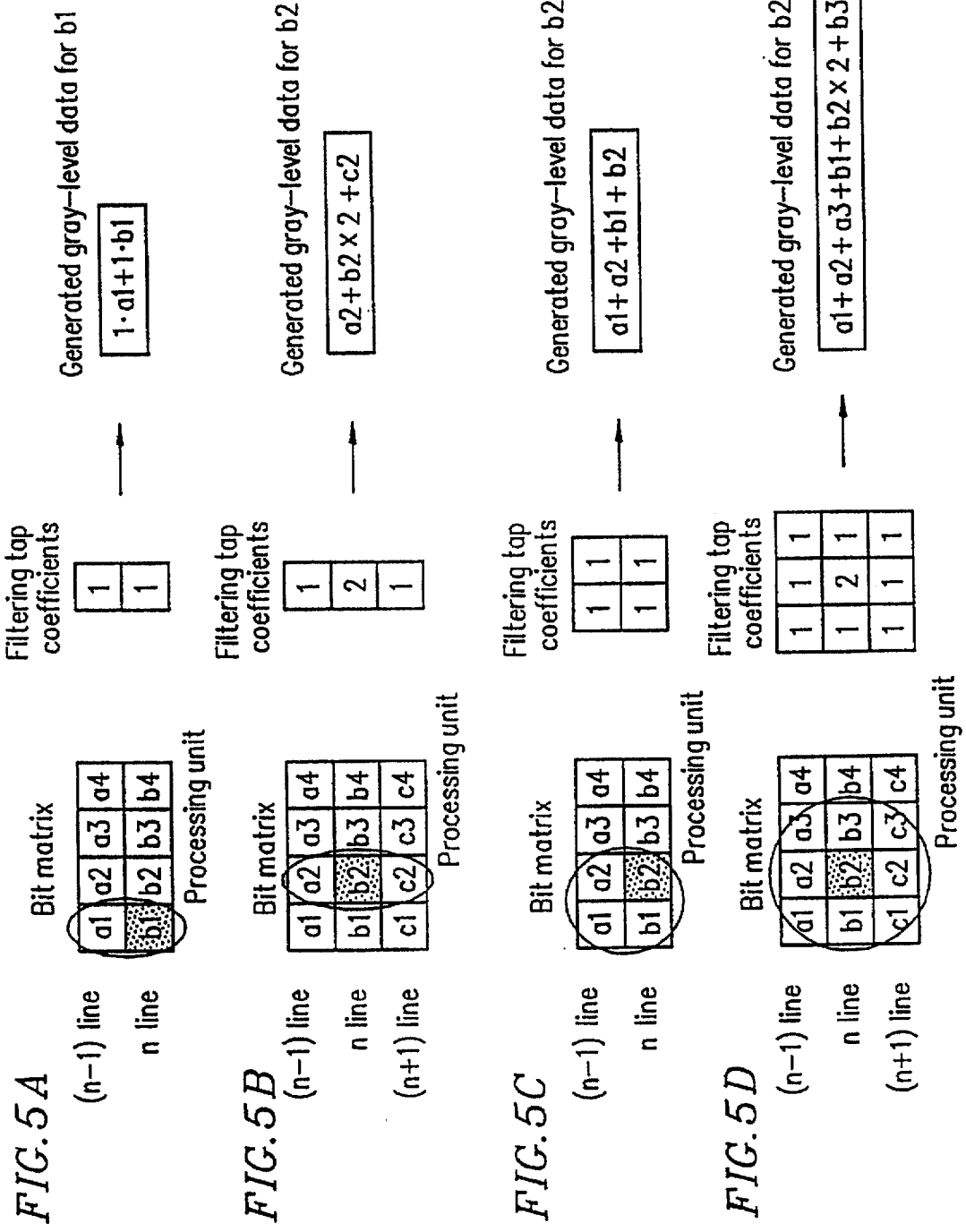

18 dot
18 line
Background color
Foreground color

▨ : 4
▨ : 3
▨ : 2
▨ : 1

GRAY-LEVEL IMAGE PROCESSING WITH WEIGHTING FACTORS TO REDUCE FLICKER

BACKGROUND OF THE INVENTION

1. Field of the Invention

The present invention relates to a method and a system for displaying binary dot matrix data in order to represent various kinds of images, e.g. characters, as a gray-level image. More particularly, the present invention relates to a display method and a display system for reducing line flicker caused by interlaced scanning.

2. Description of the Related Art

In recent years, more and more systems, e.g. a home shopping system, utilizing a household TV (television) receiver as an information terminal have been developed. A TV receiver used for such systems displays character information, e.g. an operation menu, on the display screen thereof. In general, a character font is constructed as a binary dot matrix. That is to say, the character is displayed on the screen of a TV receiver as a dot matrix consisting of two colors of black (as a background color) and white (as a foreground color), for example. In the case of displaying a monochrome character on the screen on a TV receiver, however, the following problems arise.

When a character or the like showing a large vertical brightness transition is displayed on the screen, a flickering state, e.g. a so-called line flicker, occurs on the screen, thereby making a viewer feel some annoyance. This phenomena results from the fact that the scanning system for a TV receiver is an interlaced scanning system. When a character having a high-resolution is displayed, the colors and/or especially the brightness differs in the adjacent lines. In other words, the brightness transition is very large in a "vertical direction" in such a case. Here, "vertical direction" means a direction perpendicular to scanning lines of the TV receiver's cathode-ray tube. Therefore, only a low-resolution display employing a large character font may be realized by a conventional system due to flicker.

A flicker is caused by interlaced scanning using a frequency of 30 Hz per frame (i.e., a field frequency of 60 Hz). If the scanning is conducted by using a frequency twice as high as an ordinary frequency per frame, i.e. the frequency of 60 Hz per frame, then the flicker becomes imperceptible to human's eyesight. In order to accomplish this duplication, the scanning is required to be conducted either by a non-interlaced scanning system, or by a frequency-duplicated interlaced scanning system with a vertical frequency duplicated to 120 Hz. According to the latter method, however, a scanning-system switching function is required to be equipped for a display system, and the circuit is required to operate in a larger bandwidth, so that the cost necessary for such a display system increases considerably.

Even in the case of conducting an interlaced scanning, the flicker may be reduced by reducing the vertical brightness transition. For example, a flicker never occurs in a displayed image of a ordinary TV broadcasting. In order to reduce a flicker, it is necessary to suppress the brightness transition between adjacent lines to a small level. The brightness in a plurality of adjacent lines is generally smoothed by processing the plurality of lines utilizing a vertical low-pass filtering technique when a raster scanning is conducted. According to this method, however, a line buffer memory for storing the data corresponding to a plurality of lines in order to process a single line and a memory controller thereof are required, so that the circuit becomes disadvantageously large. To be sure, this method may reduce the flicker, but the sharpness is sacrificed over the entire picture displayed on the screen. Accordingly, in view of the prevention of the degradation of the display quality, the processing is preferably conducted with respect to the character display region alone.

U.S. Pat. No. 4,454,506 entitled "Method and Circuitry for Reducing Flicker in Symbol Displays" discloses such a technique conducted with respect to the character display region alone. This patent is related to a method and a circuitry for reducing a flicker as being applied to the display conducted by a raster scanning while reading character fonts from a font read-only memory (ROM), e.g. a character display terminal. More specifically, according to this technique, first, the brightness difference between the dot of the scan line being currently scanned and that of the scan lines adjacent to the scan line being currently scanned is detected. Next, if the brightness difference is at a predetermined level or more, the signal levels of the dot on the adjacent scan lines are controlled, thereby reducing the brightness transition. According to this technique, however, the signal to be applied to the scan lines adjacent to the current scan line is changed. Specifically, the character font itself being scanned is output not in a distorted state. However, the regions adjacent to the character font in a direction perpendicular to the scanning direction are affected. As a result, the size of the character font is changed.

Japanese Patent Publication No. 4-78230 entitled "Character Broadcasting Receiving System" discloses another processing technique conducted with respect to the character display region alone. According to this receiving system, first, a character font represented based on the binary data is filtered by using plural kinds of aperture patterns. Thereafter, the binary data of the filtered character font is synthesized, thereby generating a gray-level font data. According to this method, however, surrounding nine pixels are required to be processed in order to generate a multi-level data for one pixel. Therefore, in the case where such a processing is conducted sequentially, the resulting speed for processing becomes slow. On the other hand, in the case where such a processing is conducted in parallel, the size of the circuit is required to be large.

According to other methods, a character font is held beforehand in gray levels instead of the binary data in order to reduce a flicker. Such a technique is presented by John E. Warnock: Proceedings of the Conference SIGGRAPH '80, The Display of Characters Using Grey Level Sample Arrays, July 1980, pp. 302–307; and by Nicholas Negroponte: Proceeding, Society for Information Display, 1980. In these methods, however, a TV receiver is also required to have character fonts in gray levels. Therefore, the amount of the information of the character fonts to be stored in a memory becomes disadvantageously large, so that a hardware for displaying such fonts cannot be realized at a low cost.

SUMMARY OF THE INVENTION

According to the present invention, a gray-level image display method for displaying an image represented by binary pixel data in multiple levels is provided. The method includes the steps of: generating a gray-level pixel data by conducting an operation with respect to respective pixels of the binary pixel data by providing predetermined weighting factors for a data of a first pixel and for a data of a second pixel adjacent to the first pixel; and displaying an image represented by the gray-level pixel data.

In one embodiment, the step of displaying the image represented by the gray-level pixel data includes the steps of: writing the gray-level pixel data into a frame memory; mapping the gray-level pixel data read from the frame memory to a predetermined set of colors consisting of a foreground color, a background color and at least one intermediate color; and displaying the gray-level pixel data on a display of an interlaced scanning system based on the mapped set of colors.

In another embodiment, in the step of generating the gray-level pixel data, the first pixel and the second pixel are adjacent to each other in a direction perpendicular to a scan line of the interlaced scanning system.

In still another embodiment, the step of generating the gray-level pixel data includes the steps of: storing the data of the first pixel into a first memory region of a memory means; and storing the data of the second pixel into the first memory region of the memory means, while storing the data of the first pixel to a second memory region of the memory means.

In still another embodiment, in the step of generating the gray-level pixel data, a plurality of pixels are adjacent to the first pixel; one of the plurality of pixels is adjacent to the first pixel in a direction perpendicular to a scan line of the interlaced scanning system; and the other of the plurality of pixels is adjacent to the first pixel in a direction parallel to the scan line.

In still another embodiment, the step of mapping the pixel data to the set of colors is a step of mapping the gray-level pixel data to the plural sets of colors.

In still another embodiment, the step of generating the gray-level pixel data includes the steps of: storing the data of the first pixel into a first memory region of a memory means; and storing the data of the second pixel into the first memory region of the memory means, while storing the data of the first pixel to a second memory region of the memory means.

In still another embodiment, the mapping step is a step of mapping the gray-level pixel data to the plural sets of colors.

In still another embodiment, the step of displaying the image represented by the gray-level pixel data includes the steps of: mapping the gray-level pixel data to a predetermined set of colors consisting of a foreground color, a background color and at least one intermediate color; writing a color data representing the mapped set of colors into a frame memory; and displaying the color data on a display of an interlaced scanning system.

In still another embodiment, the step of generating the gray-level pixel data includes the step of mapping the binary pixel data to a color data representing a predetermined background color and a predetermined foreground color; and in the step of generating the gray-level pixel data, the data of the first pixel is a gray-level color data corresponding to the first pixel and the data of the second pixel is gray-level color data corresponding to the second pixel.

According to another aspect of the present invention, a gray-level image display apparatus for displaying an image represented by a binary pixel data is provided. The gray-level image display apparatus includes: a generating means for generating a gray-level pixel data by conducting an operation with respect to respective pixels of the binary pixel data by providing predetermined weighting factors for a data of a first pixel and for a data of a second pixel adjacent to the first pixel; and a display means for displaying an image represented by the gray-level pixel data.

In one embodiment, the display means for displaying the image represented by the gray-level pixel data includes: a writing means for writing the gray-level pixel data into a frame memory; a mapping means for mapping the gray-level pixel data read from the frame memory to a predetermined set of colors consisting of a foreground color, a background color and at least one intermediate color; and a display means for displaying the gray-level pixel data on a display of an interlaced scanning system based on the mapped set of colors.

In another embodiment, the first pixel and the second pixel are adjacent to each other in a direction perpendicular to a scan line of the interlaced scanning system.

In still another embodiment, the generating means for generating the gray-level pixel data includes an FIFO (first-in first-out) type register for operation based on the data of the first pixel and the data of the second pixel.

In still another embodiment, a plurality of pixels are adjacent to the first pixel; one of the plurality of pixels is adjacent to the first pixel in a direction perpendicular to a scan line of the interlaced scanning system; and the other of the plurality of pixels is adjacent to the first pixel in a direction parallel to the scan line.

In still another embodiment, the mapping means maps the gray-level pixel data to the plural sets of colors.

In still another embodiment, the generating means for generating the gray-level pixel data includes an FIFO (first-in first-out) type register for operation based on the data of the first pixel and the data of the second pixel.

In still another embodiment, the mapping means maps the gray-level pixel data to the plural sets of colors.

In still another embodiment, the display means for displaying the image represented by the gray-level pixel data includes: a mapping means for mapping the gray-level pixel data to a predetermined set of colors consisting of a foreground color, a background color and at least one intermediate color; a writing means for writing the color data representing the mapped set of colors into a frame memory; and a display means for displaying the color data on a display of an interlaced scanning system.

In still another embodiment, the generating means for generating the gray-level data includes a mapping means for mapping the binary pixel data to a color data representing a predetermined background color and a predetermined foreground color; and in the generating means for generating the gray-level data, the data of the first pixel is gray-level color data corresponding to the first pixel and the data of the second pixel is gray-level color data corresponding to the second pixel.

According to the present invention, even in the case of displaying a character font of high-resolution, the vertical brightness transition may be reduced, thereby realizing a display with a reduced flicker.

In a method and a system for displaying a gray-level image according to the invention, only a dot matrix data region for displaying a character and the like possibly with a flicker is exclusively processed. As a result, the sharpness in the remaining image region is not sacrificed. In addition, the gray-level pixel data is generated not at the raster scanning, but at the writing of the data into a frame memory. Therefore, conventional large-scale hardware is not necessary. Furthermore, this gray-level pixel data may be also be generated by using software alone. Since the data to be generated has the same size as that of the original matrix, the space between adjacent characters is not changed. As a result, the processing to be conducted before writing the data into a frame memory never becomes complicated.

In a method and a system for displaying a gray-level image according to the invention, a background color, a foreground color, and an intermediate color may be assigned so as to correspond to a predetermined background color by transforming the generated gray-level data. Accordingly, a display using colors other than black, white and intermediate colors thereof is possible with a reduced flicker.

In addition, in the case where the dot matrix data is color-extended and then the pixel data adjacent to the dot matrix data in vertical and/or horizontal directions is processed by a low-pass filtering operation, the same effects as those described above may be obtained.

Moreover, in the case of applying a method and a system for displaying a gray-level image of the invention to a black/white image such as a facsimile, the same effects may be obtained. The data of the image received by a facsimile is binary dot matrix data. If this data is processed by the method described above, then a facsimile image with a reduced flicker is displayed on the screen of a TV receiver using an interlaced scanning system. The same effects may be attained so long as the invention is applied to image data represented by the binary data.

Thus, the invention described herein makes possible the advantage of providing a method and a system for conducing a high-resolution binary image display in an interlaced scanning system with a reduced flicker by using gray-level data with a suppressed vertical brightness transition. Such gray-level data is generated by a simplified method in which a font represented by binary data is utilized the size of the font is not changed.

This and other advantages of the present invention will become apparent to those skilled in the art upon reading and understanding of the following detailed description with reference to the accompanying figures.

BRIEF DESCRIPTION OF THE DRAWINGS

FIGS. 5A through 5D are views illustrating methods for conducting filtering operations by using two pixels for one pixel; three pixels for one pixel; four pixels for one pixel; and nine pixels for one pixel, respectively.

DESCRIPTION OF THE PREFERRED EMBODIMENT

Figure 1:
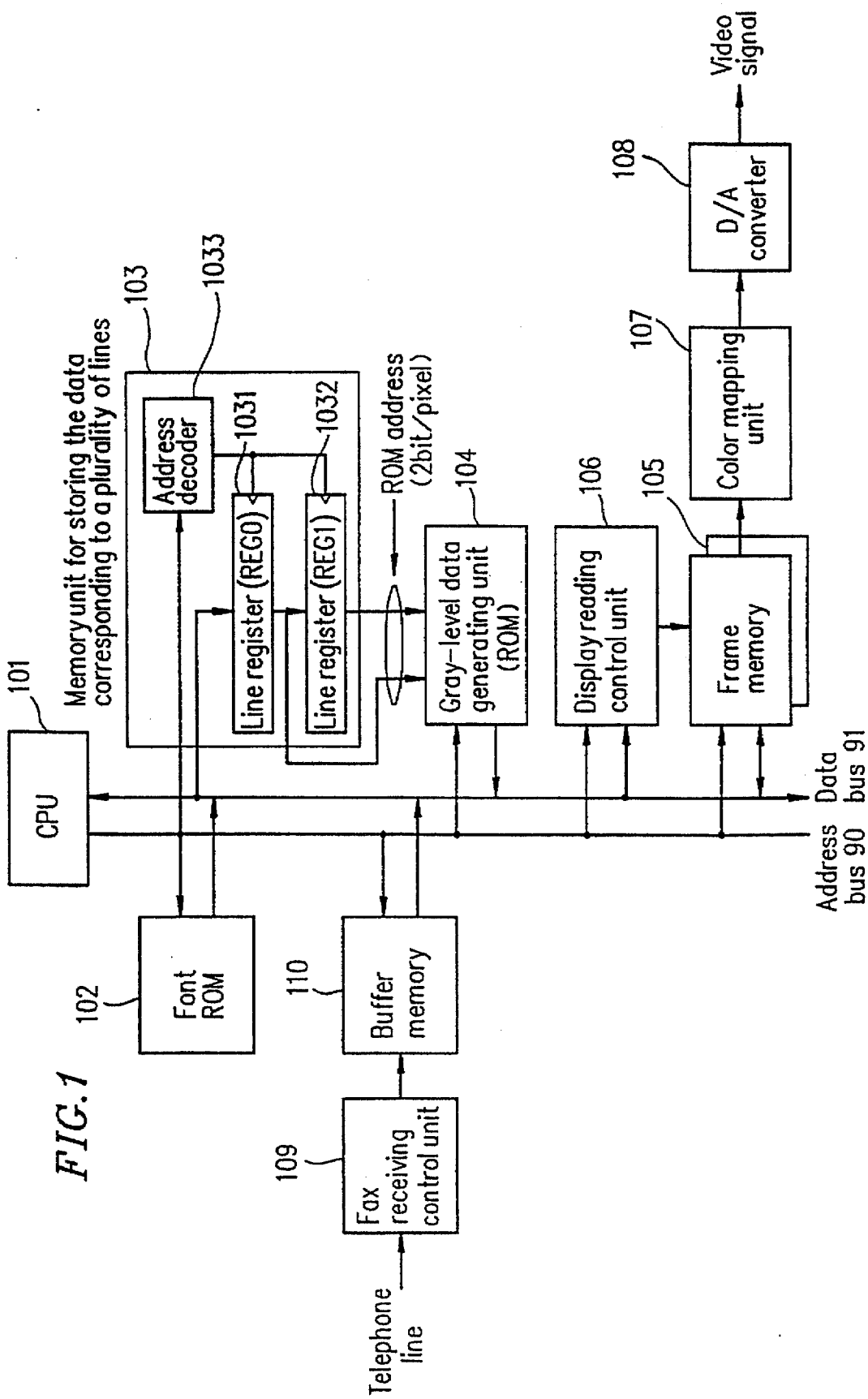
FIG. 1 is a block diagram of a gray-level image display system according to a first example of the present invention.

Hereinafter, the present invention will be described by way of illustrative examples with reference to the accompanying figures. It is noted that the same reference numerals herein denote like components corresponding to each other, and that an "image" includes a character, a picture, and the like.

EXAMPLE 1

Referring to FIGS. 1 through 4, a first example of a gray-level image display method and system according to the present invention will be described in detail below.

FIG. 1 shows the construction of a gray level image display system according to the first example of the invention. A central processing unit (CPU) 101 for controlling the entire system is connected to an address bus 90 and a data bus 91. A character font data constructed by a binary dot matrix is stored in a font ROM 102. As will be described later, in a display method and system according to the invention, there is no distinction between a character font data and a facsimile (FAX) image data, so long as the data is binary. In the following description, the data of the respective pixels of an image represented in a dot matrix will be referred to as a "pixel data". Since the pixel data stored in the font ROM 102 is represented either by "0" or "1", the pixel data may be called binary. When an address is input to the font ROM 102 via the address bus 90, the font ROM 102 outputs the binary pixel data to the data bus 91. A memory unit 103 for storing the data corresponding to a plurality of lines stores the data corresponding to eight pixels in adjacent two scan lines from the binary pixel data output by the font ROM 102. The memory unit 103 includes line registers 1031 and 1032 and an address decoder 1033 controlled by the CPU 101 for writing the pixel data from the font ROM 102 into the line registers 1031 and 1032. The binary pixel data output from the font ROM 102 is transmitted to the CPU 101 via the data bus 91 and then written into the line register 1031 based on the signal decoded by the address decoder 1033. Then, the data stored in the line register 1031 (REG0) is shifted to the line register 1032 (REG1). That is to say, the lines register 1031 and 1032 are of the first-in first out (FIFO) type. Accordingly, the line register 1032 (REG1) always hold the data of one scan line preceding the line stored in the line register 1031 (REG0).

A gray-level data generating unit 104 controlled by the CPU 101 generates a gray-level pixel data from the binary pixel data. The gray-level pixel data indicates in which of the three kinds of colors, i.e. a background color, a foreground color, and an intermediate color, the respective pixels should be displayed. In this example, the gray-level pixel data indicates that "0" should be mapped to the background color; "2" should be mapped to the foreground color; and "1" should be mapped to the intermediate color. The generated gray-level pixel data is written into a frame memory 105. The frame memory 105 stores an image corresponding to an entire frame as a dot matrix data, e.g. a data has 640 dots in a horizontal direction and 480 dots in a vertical direction. A three-level data is to be stored in this example, so that the frame memory is required to store two bits for one gray-level pixel data. A display reading-control unit 106 reads the data from the frame memory 105 by using an interlaced scanning. A color mapping unit 107 transforms the pixel data read out from the frame memory 105 into a color data. A color data herein refers to a pixel data specifying the actual colors to be displayed on the CRT of the TV receiver. For example, if a set of color data having 24 bits (i.e. 8 bits for each color of red, green and blue) per pixel is employed, then a so-called full-color displaying is realized. A digital/analog (D/A) converting unit 108 receives the digital color data, and then converts the digital data into an analog color video signal. The color video signal converted by the D/A converting unit 108 is input to an interlaced scanning display system, e.g. a monitor of a TV receiver, thereby displaying an image.

A FAX receiving-control unit 109 receives a FAX image data transmitted via a telephone line so as to output the data as a binary pixel data. A buffer memory 110 stores the binary pixel data output from the FAX receiving-control unit 109. Since a FAX image data is also constructed by a binary dot matrix, the FAX image data may also be processed in the same way as a font data output from the font ROM 102 which is a binary data.

Figure 2:
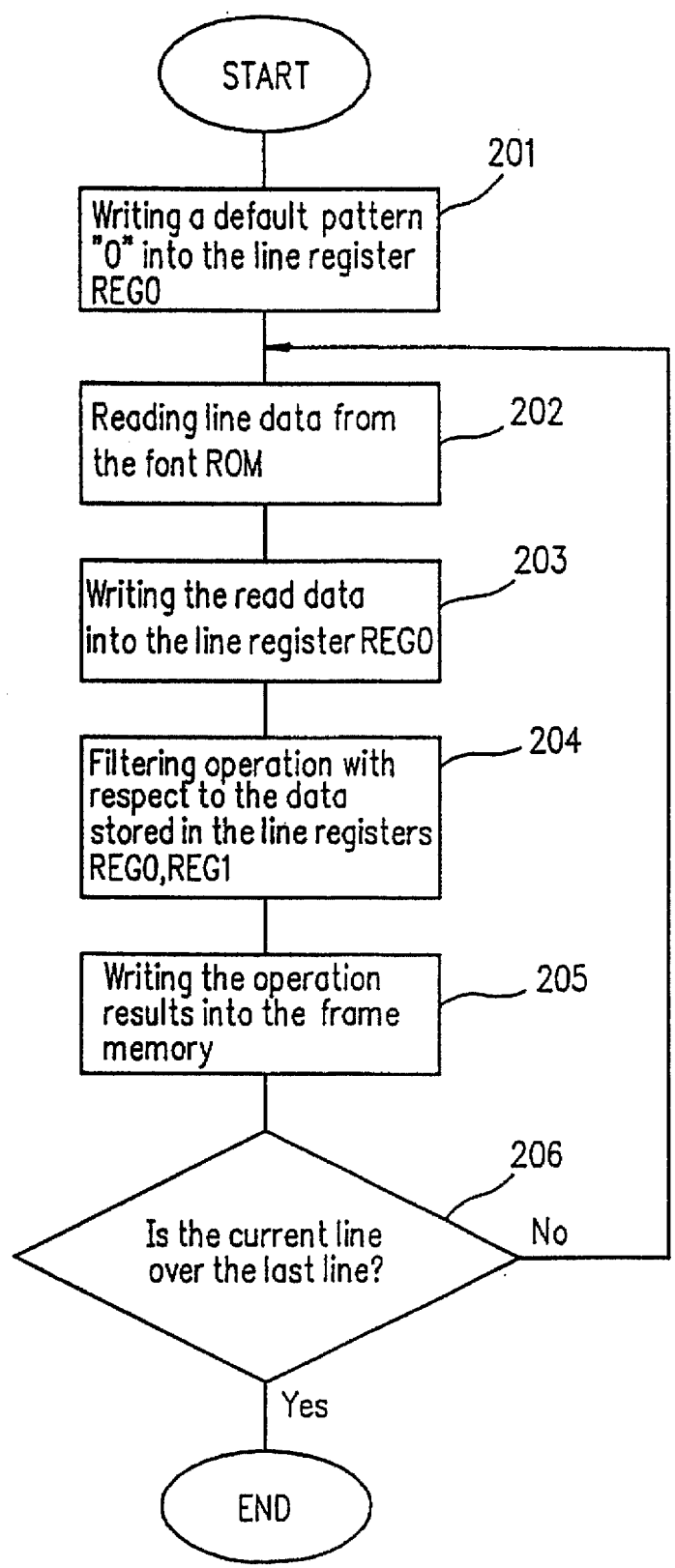
FIG. 2 is a flow chart showing a gray-level image display method according to the present invention.

FIG. 2 is a flow chart showing a gray-level image display method according to the present invention.

In Step 201, the CPU 101 writes a default pattern, e.g. a pattern of successive "0"s, into the line register 1031 (REG0). The Step 201 is necessary because data corresponding to a line preceding the first line of a font matrix does not exist.

In Step 202, the CPU 101 reads sequentially the data to be processed on an "eight-pixel basis" from the font ROM 102. Here, "eight-pixel basis" means reading, writing, or processing data corresponding to eight pixels at one time. Since the pixel data stored in the font ROM 102 is binary, reading the pixel data on an eight-bit basis is one of convenient ways to read. In the case where a font includes eight pixels or more in a horizontal direction, the pixel data is first read on an eight-pixel basis, and then the remaining pixel data is read by repeating the processing on the eight-pixel basis.

In Step 203, the CPU 101 writes the pixel data corresponding to eight pixels read out in Step 202 into the line register 1031 (REG0). Then, the data stored in the line register 1031 (REG0) by the memory unit 103 for storing the data corresponding to a plurality of lines is shifted to the line register 1032 (REG1). This shift operation is easily realized because the line registers 1031 and 1032 are of the FIFO type. In other words, the line registers 1031 and 1032 always hold the pixel data corresponding to successive two lines, or adjacent lines.

Figure 3A:
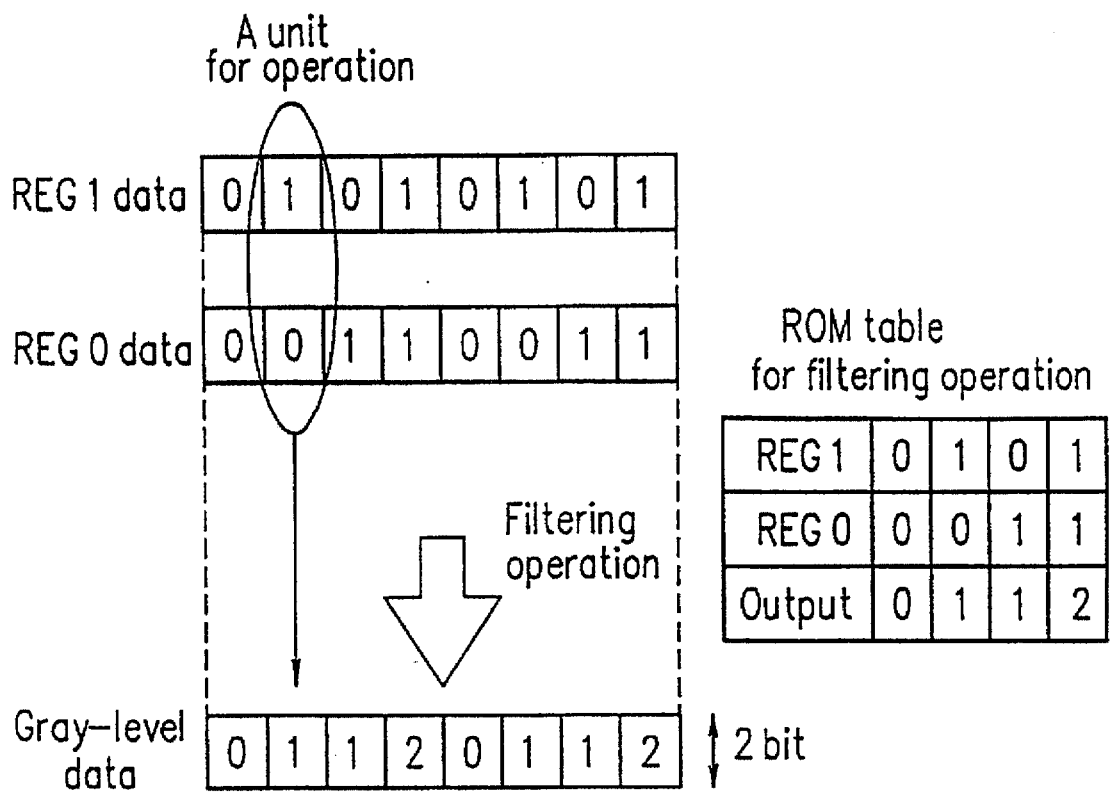
FIG. 3A is a view showing a method for conducting a filtering operation of the pixel data corresponding to two lines in a gray-level data generating unit shown in FIG. 1.

In Step 204, the gray-level data generating unit 104 conducts a filtering operation with respect to the pixel data stored in the line registers 1031 and 1032 included in the memory unit 103 for storing the data corresponding to a plurality of lines. As shown in FIG. 3A, the two line registers 1031 and 1032 respectively store the pixel data corresponding to the eight pixels in two lines adjacent to each other in a vertical direction, i.e., a direction perpendicular to the two lines of eight successive pixels. It is noted that a "vertical direction" means a direction perpendicular to the successive pixels to be processed at one time and a "horizontal direction" means a direction parallel to the successive pixels to be processed at one time. The gray-level data generating unit 104 conducts a low-pass filtering operation with respect to the bits corresponding to the respective pixel data stored in the line registers 1031 and 1032 based on the following Equation (1) as shown in FIG. 3A.

(generated gray-level data)=(pixel data in REG0)+(pixel data in REG1)  (1)

In the above Equation (1), "+" denotes an arithmetic sum. In the data stored in the line registers 1031 and 1032, one bit corresponds to one pixel. Therefore, the operation results obtained by the above Equation (1) are expressed in a ROM table shown in FIG. 3A. In this example, this operation is realized by using the ROM in which the table shown in FIG. 3A is stored. The operation can be realized by software and/or hardware. The low-pass filtering operation results in the generation of a gray-level (in this example, three-level) data to be coded by the three integers of "0", "1" and "2". The gray-level data has two-bit information per pixel. As a result, a ROM having a small storage capacity of eight bits per pixel is realized. This is because each operation result contains 2 bits and four operation results are required. Four pairs of pixel data corresponding to the two line registers are input sequentially to the ROM addresses as shown in FIG. 3A. The low-pass filtering operation results are obtained as the data output from the ROM. If eight ROMs respectively storing the table shown in FIG. 3A are provided, then the gray-level data corresponding to eight pixels may be generated in parallel. Also in such a case, the ROM may have a small storage capacity of approximately 64 bits (8 times 8 bits) necessary for conducting the filtering operation.

Referring to FIG. 2 again, in Step 205, the CPU 101 reads out the operation result from the gray-level data generating unit 104 so as to obtain the pixel data, and then writes the pixel data into the frame memory 105.

In Step 206, if the line being currently written into the frame memory 105 is not over the last line to be processed, then the CPU 101 selects the "No" branch and then returns to Step 202. On the other hand, if the current line is over the last line, then the CPU 101 selects the "Yes" branch, and the processing corresponding to one font is terminated. That is to say, the CPU 101 executes the processing of Steps 202 through 205 until the last line of the font is processed, i.e. until the processing corresponding to one font is terminated. A software, or an application program for displaying fonts stores information about fonts to be processed in a frame and the location of the fonts to be written into the memory.

In Step 201 mentioned above, "0" is selected as the default pattern. Alternatively, "1" can be used.

In Step 203, providing that the lines of the font are sequentially denoted by a line $L_1$, a line $L_2$, a line $L_3$, etc. from up to down, then the pairs of the font data corresponding to successive two lines become the groups of data shifted sequentially:

(generated data in the first line)=a low-pass filtering operation ("0", $L_1$)

(generated data in the second line)=low-pass filtering operation ($L_1$, $L_2$)

(generated data in the third lines)=a low-pass filtering operation ($L_2$, $L_3$)

(generated data in the fourth line)=low-pass filtering operation ($L_3$, $L_4$)

(generated data in the N-th line)=low-pass filtering operation ($L_N$, $L_{N-1}$), etc.

wherein "low-pass filtering operation ($L_N$, $L_{N-1}$)" means performing low-pass filtering operation on the lines $L_N$, $L_{N-1}$.

In this example, the registers of an FIFO type are employed. That is to say, when the pixel data of a new line is written by the memory unit 103 for storing the data corresponding to a plurality of lines, the stored pixel data of the line immediately before the current line is shifted sequentially. As a result, in processing the second line and the remaining lines after the second lines, the pixel data corresponding to the two lines which is necessary for processing is always held in two line registers only by writing the pixel data of a single new line. Therefore, it is not necessary to write the pixel data corresponding to two lines into the two line registers 1031 and 1032 every time the filtering operation is performed, thereby realizing a high-speed processing. A processing at an even higher speed is realized when the registers of the FIFO type are implemented by hardware. The registers of the FIFO type may be implemented by flip-flops or latches connected in series to which an identical clock is supplied. The number of bits which the registers have corresponds to the number of the flip-flip-flops connected in series. In the case where the FIFO type latches are implemented by software, the registers inside the CPU may be utilized, for example.

In the flow chart shown in FIG. 2, the processing is conducted on an eight-pixel basis per line. However, the width of the line to be processed at one time is not limited to the width composed of eight pixels. So long as the conditions of the hardware and the software to be used permit, the line width can be set at an arbitrary bit width, and is not restricted by the size itself of the image to be displayed.

In Step 205, the gray-level pixel data to be written into the frame memory 105 by the CPU 101 has two bits per pixel. Accordingly, the frame memory 105 is also required to have a storage capacity of at least two bits per pixel.

The gray-level pixel data written into the frame memory 105 in the above-described Steps is read out by the display reading-control unit 106 using the interlaced scanning. The color mapping unit 107 receives the gray-level pixel data as the input thereto, and then outputs the color data of red (R), green (G) and blue (B). The D/A converter 108 receives the color data, then outputs an analog video signal for displaying images on a CRT of a TV receiver.

Figure 3B:
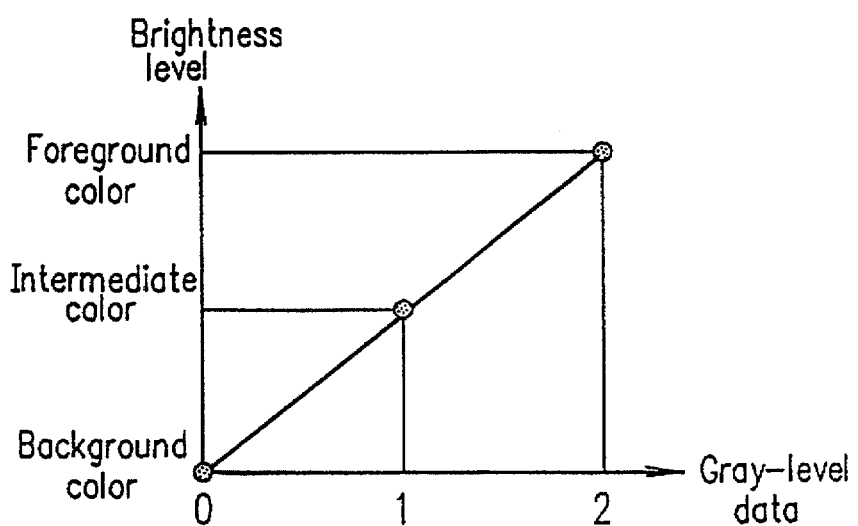
FIG. 3B is a graph showing the relationship between the generated gray-level data and the display colors.

As shown in FIG. 3B, the color mapping unit 107 transforms: the pixel data of "0" into the background color data; the pixel data of "2" into the foreground color data; and the pixel data of "1" into the intermediate color data, respectively. Hereinafter, a set of these background, foreground, and intermediate colors will be referred to as a "set of colors". In this example, the gray-level pixel data is mapped to a single set of colors. For example, the color mapping unit 107 outputs: the background color, e.g. black for the input of "0"; and the intermediate color, e.g. gray for the input of "1"; and the foreground color, e.g. white for the input of "2". FIG. 3B shows the relationship between the gray-level pixel data and the brightness levels for the background, foreground and intermediate colors. The x-axis expresses a value of the gray-level pixel data and the y-axis expresses a brightness level of the colors represented by the respective color data. As shown in FIG. 3B, as the value of the gray-level pixel data becomes larger (i.e. "0", "1" and "2" in this order), the brightness level of each color corresponding to the pixel data increases linearly. However, the relationship between the value of the pixel data and the brightness level is not always required to be linear. The relationship may be non-linear considering the gamma correction of a CRT of a TV receiver, for example.

Figure 4A:
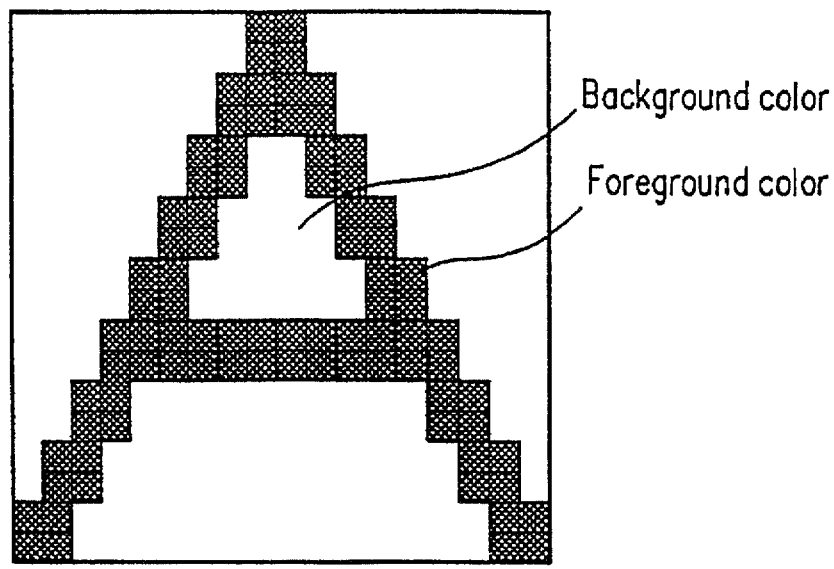
FIG. 4A is a view showing a character font.
Figure 4B:
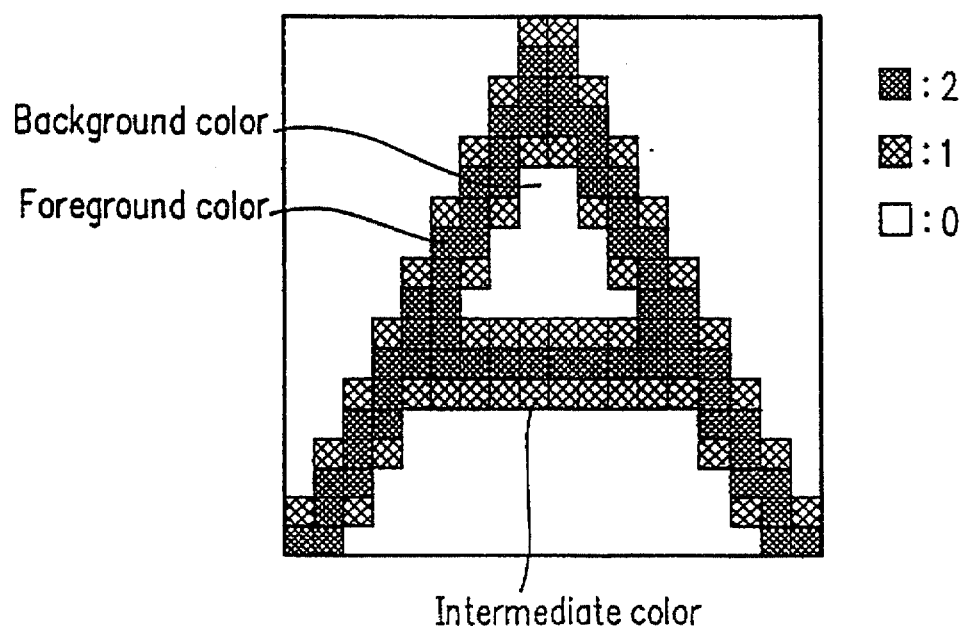
FIG. 4B is a view showing a character output on the screen as a video signal by the method of Example 1.

FIG. 4A shows the image represented in two colors, i.e. the background and the foreground colors, according to a display method not performing the processing described in this example. When the processing of this example is conducted, the pixels around the edges which are adjacent to each other in a vertical direction, i.e., a direction perpendicular in scanning lines are displayed in an intermediate color, as shown in FIG. 4B. As a result, display of the image with a small vertical brightness transition is realized. In addition, a gray-scale tone character such as that drawn in FIG. 4B has an advantage of giving no visual annoyance to a viewer because of the spatial frequency characteristics of a human's eyesight (more specifically, the human eyesight exhibits low sensitivity in a high-frequency region like that of a low-ass filter). In addition, the size of the character of FIG. 4B which has been generated as a gray-level data (other than data of "0") is the same as the original size of the character of FIG. 4A. Accordingly, the change of a space between adjacent two characters which occurs inevitably in the case of processing by using a conventional system may be eliminated, so that the processing before the writing the image data into a frame memory never becomes complicated. If the change of the space between characters occurs, then the processing like "write disable" on edge region of the adjacent characters is necessary to be performed. Therefore, no change of the sizes of the generated characters in accordance with the invention is one of the advantages.

A dot matrix data to be processed is not limited to a character font data. The above-mentioned processing may be conducted with respect to a binary FAX image data accumulated in a buffer memory 110 via a FAX receiving control unit 109. In such a case, similar processing may be conducted by regarding the entire FAX image accumulated in the buffer memory 110 as a single character font.

In the processing of Steps 202 and 204 conducted by using the memory unit 103 for storing the data corresponding to a plurality of lines and a gray-level data generating unit 104, the transformation by the ROM table as shown in FIG. 3A may be implemented by a look-up table by software. For example, the following scheme can be utilized using a first and a second variables of a software program. 1) The data of the first line is stored in the first variable. 2) The first and the second variables's data are swapped. 3) The data of the second line is stored in the first variable. 4) Again, the first and the second variables's data are swapped. 5) The data of the third line is stored in the first variable. Repeating these steps realizes the same function as the FIFO registers without using the hardware FIFO registers. Accordingly, the method and the system of the invention may be realized easily by software run by the CPU 101 at a practical speed.

As shown in FIG. 5A, in this example, the following filtering operation is conducted by the gray level data generating unit 104 with respect to the two pixel data a1 and b1:

$$1 \cdot a1 + 1 \cdot b1$$

The result of the above equation is regarded as the generated gray-level data of b1. The coefficients for a1 and b1 are generally called weighting factors or filtering factors. Herein, this operation will be called an "operation by [1, 1] filtering coefficients" by using the filtering coefficient 1 for a1 and b1. However, the operation conducted by the gray-level data generating unit is not limited to the operation using this [1, 1] filtering coefficients. For example, the operation may be conducted by using other filtering coefficients shown in FIGS. 5B, 5C and 5D.

FIG. 5B shows the filtering operation using a three-bit matrix data, i.e. one pixel in a horizontal direction for three lines in a vertical direction, and a [1, 2, 1] filtering coefficients. As a result, the generated gray-level data for L2 is expressed by the following equation:

$$1 \cdot a2 + 2 \cdot b2 + 1 \cdot c2$$

Figure 6A:
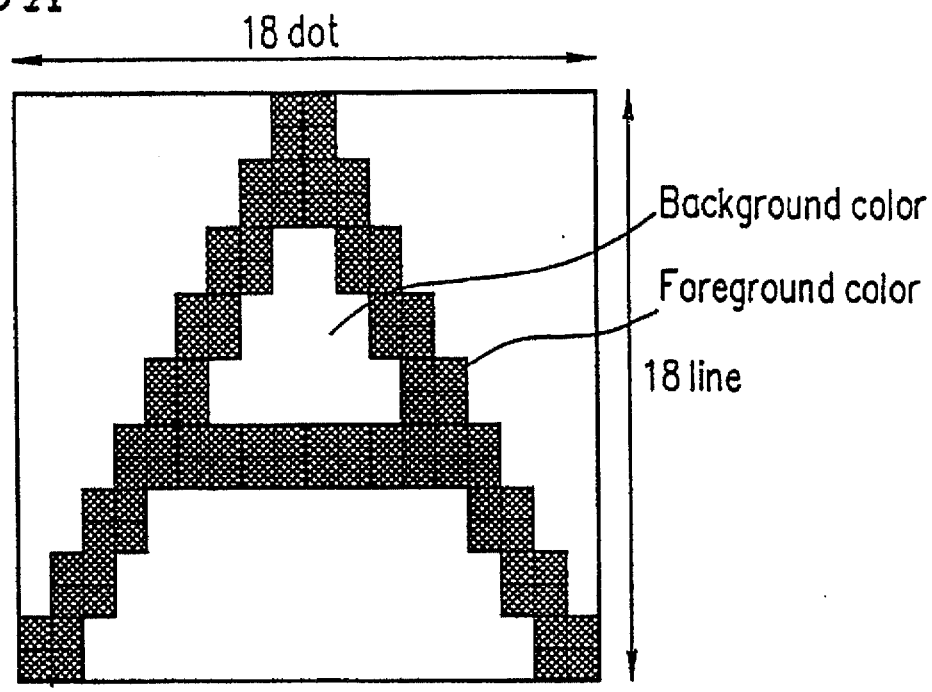
FIG. 6A is a view showing a character font.
Figure 6B:
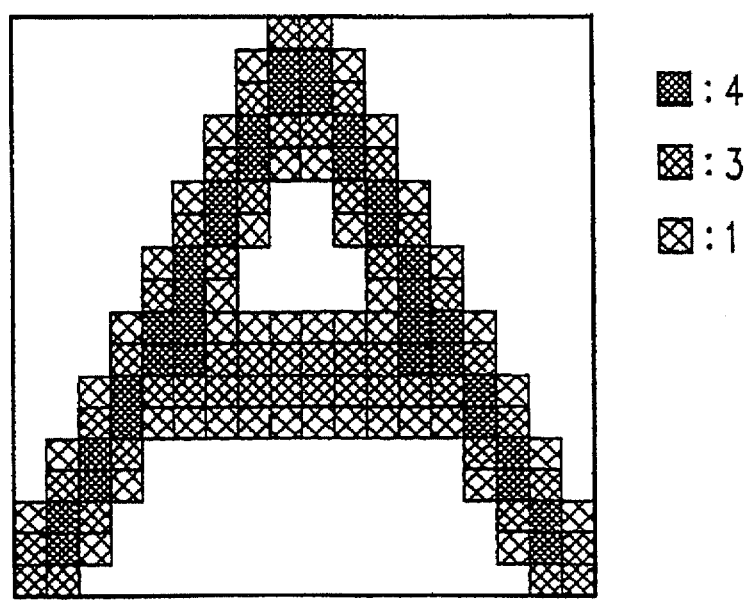
FIG. 6B is a view showing a gray-level character obtained through a filtering operation conducted by using three pixels for one pixel.

This filtering operation is conducted by using two lines being vertically adjacent to each other for the dot matrix to be written into the frame memory 105. In this case, the memory unit 103 for storing the data corresponding to a plurality of lines is required to include lines registers for storing the data corresponding to three lines. As a result, a five-level data (three bits per pixel) to be coded by the five integers of "0" through "4" is generated. Accordingly, a multi-level display may be realized in one background color, one foreground color and three intermediate colors. If the character font shown in FIG. 6A is processed in this way, then the multi-level pixel data shown in FIG. 6B is generated. As compared with the operation by the [1. 1] filtering coefficients using the data corresponding to one line, the vertical brightness transition may further be reduced. It is to be noted that the capacity of 24 bits, i.e. eight pairs of three bits per pixel, is required for realizing the filtering operation shown in FIG. 5B by using a ROM table. The eight pairs are necessary because each of the values a2, b2 and c2 can be "0" or "1" and the combination of the three values has eight varieties.

FIG. 5C schematically shows a two-dimensional filtering operation to be conducted with respect to a dot matrix data corresponding to two pixels in a horizontal direction per two lines in a vertical direction. The generated gray-level data for b2 is expressed by the following equation:

$$1 \cdot a1 + 1 \cdot a2 + 1 \cdot b1 + 1 \cdot b2$$

Figure 7A:
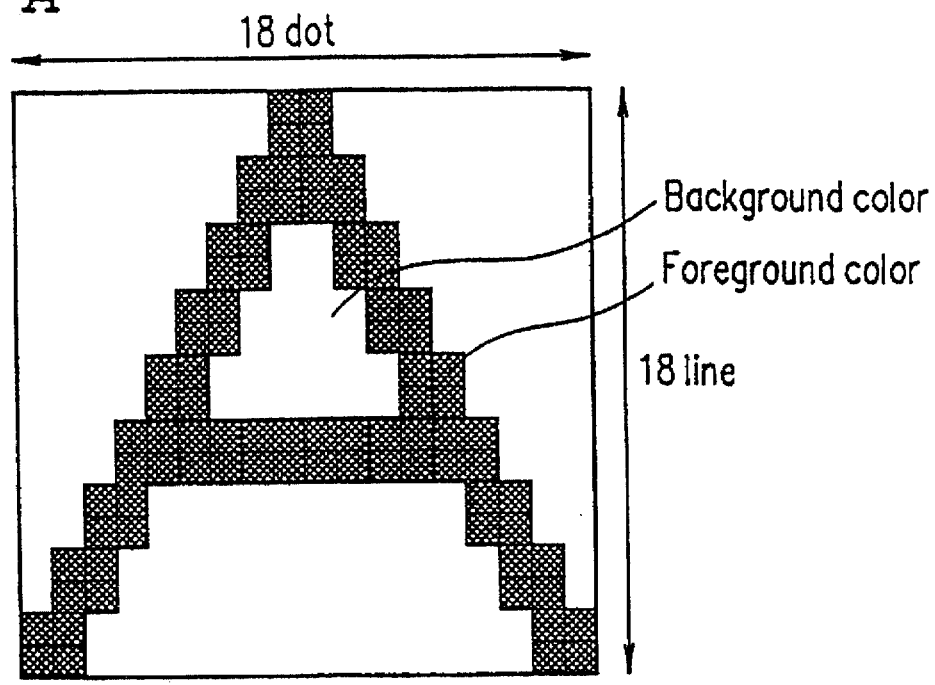
FIG. 7A is a view showing a character font.
Figure 7B:
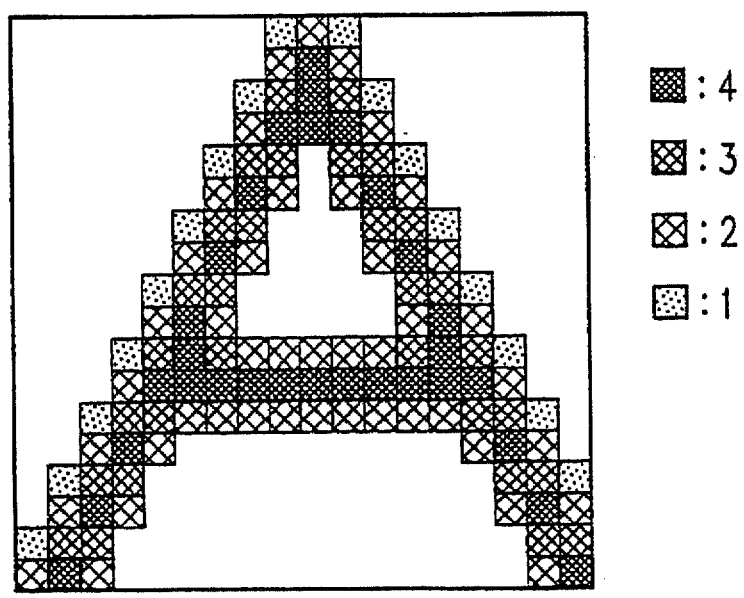
FIG. 7B is a view showing a gray-level character obtained through a filtering operation conducted by using four pixels for one pixel.

The gray-level pixel data to be generated becomes a five-level data (three bits per pixel) to be coded by the five integers of "0" through "4". In such a case, the memory unit 103 for storing the data corresponding to a plurality of lines may be constructed by the line registers for storing the data corresponding to two lines in the same way as that shown in FIG. 1. In the case where the gray-level data generating unit 104 is constructed by a ROM, the ROM is required to have a capacity of 48 bits, i.e. 16 pairs of three bits per pixel. The 16 pairs are necessary because each of the values a1, a2, b1 and b2 can be "0" or "1" and the combination of the four values has 16 varieties. The character to be generated is smoothed also in the horizontal direction as shown in FIG. 7B as compared with an original character font shown in FIG. 7A.

FIG. 5D shows a two-dimensional filtering operation to be conducted with respect to a dot matrix data corresponding to three pixels in a horizontal direction for three lines in a vertical direction. The generated gray-level data for b2 is expressed by the following equation:

$$1 \cdot a1 + 1 \cdot a2 + 1 \cdot a + 1 \cdot b1 + 2 \cdot b2 + 1 \cdot b3 + 1 \cdot c1 + 1 \cdot c2 + 1 \cdot c3$$

In all the cases shown in FIGS. 5A through 5D, the size of the dot matrix to be written into the frame memory 105 is the same as that of the original font.

As is apparent from the description above, the number of the pixels to be processed by a filtering operation is not limited according to the present invention. However, the number or the pixels to be processed by the filtering operation affects the scale of the circuit to be used for the operation and the processing time by a software. In order to reduce only the line flicker in the interlaced scanning system, it is sufficient to conduct the filtering operation with respect to the two lines adjacent to each other in a vertical direction, as shown in FIGS. 5A and 5B.

As described above, in this example, the low pass filtering operation is conducted with respect to the binary pixel data as a preceding processing for the image display. The generated gray-level pixel data is mapped to the background, foreground, and intermediate colors, thereby reducing the vertical brightness transition. As a result, a character may be displayed with a reduced flicker even on an interlaced scanning monitor. The filtering operation may be applied not only to a character font data, but also to a FAX image data, a kind of binary image data. In the case of using such a FAX image instead of the character font, a FAX image with a reduced flicker may be displayed on an interlaced scanning monitor. This processing method may be applied to any image data, e.g. a computer-graphic image, so long as the image data is constructed by the binary codes. The same effects may also be attained in such cases.

EXAMPLE 2

In Example 1, a single "set of colors", i.e. a single set of the background, foreground, and intermediate colors is used for displaying an image (In the description of the previous example, the background color is black; the foreground color is white; and the intermediate color is gray, respectively). Hereinafter, a second example of a gray-level image display method and system according to the present invention will be described. In this Example 2, an image represented based on the binary data may be displayed by using an interlaced scanning monitor and plural sets of colors with a reduced flicker.

Figure 8:
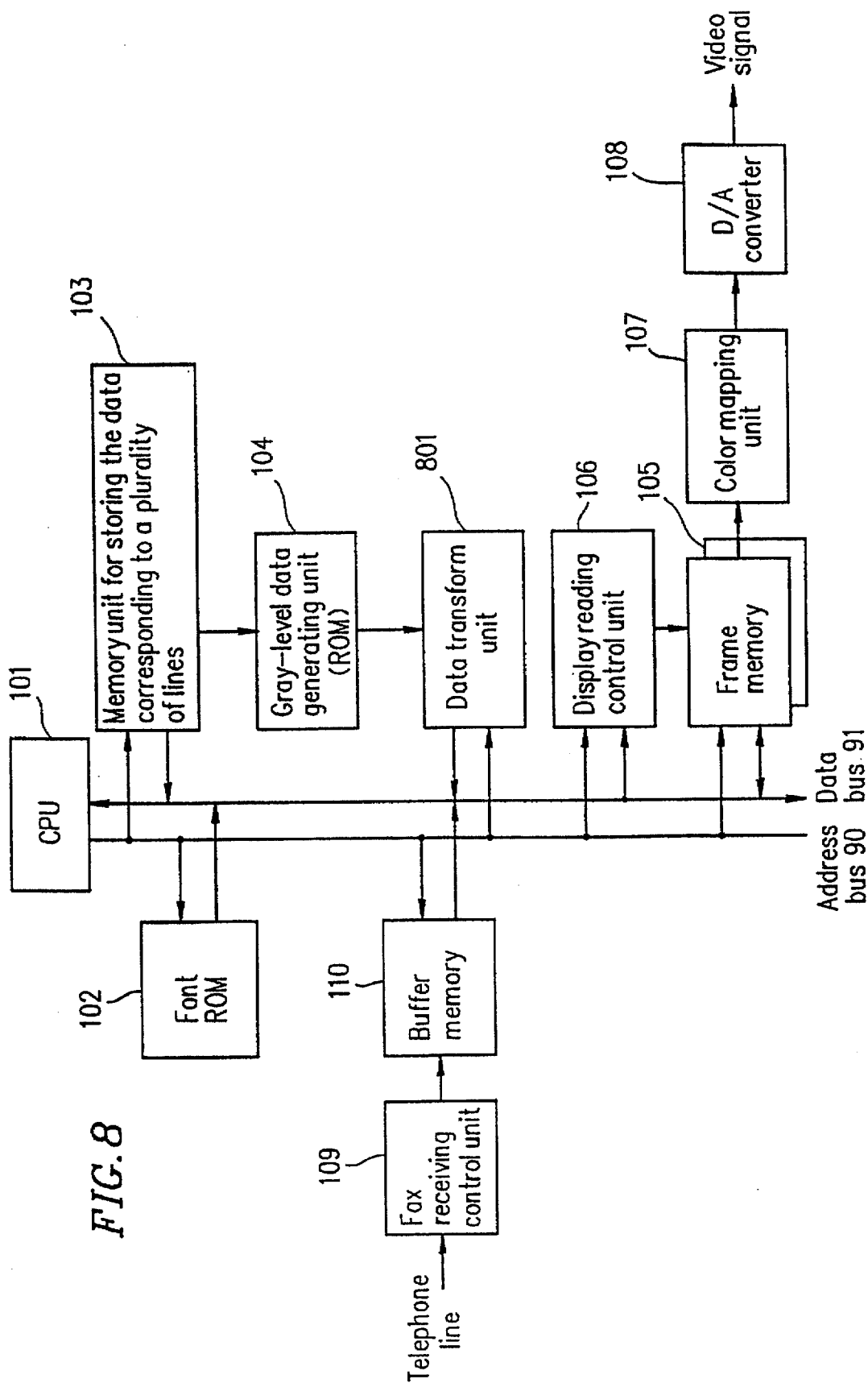
FIG. 8 is a block diagram of a system for enabling a display using plural sets of colors consisting of the background, foreground, and intermediate colors in conducting a dot matrix display according to the first example as shown in FIG. 1.

FIG. 8 shows a construction of a gray-level image display system according to another example of the present invention. In this Example 2, the gray-level pixel data may be displayed so as to mapped to the three sets of colors. In the same way as in Example 1, a gray-level (three-level) pixel data is generated from a binary pixel data. A data transform unit 801 selectively maps the gray-level pixel data generated by the gray level data generating unit 104 to the three sets of colors in accordance with the background color. Since a set of colors is composed of three kinds of colors and the number of such sets to be used in this example is three, the pixel data output from the data transform unit 801 is coded by nine integers of "0" through "8". A frame memory 105 stores this nine-level pixel data. A color mapping unit 107 receives the nine-level pixel data read out from the frame memory 105 thereby outputting color data corresponding to the respective nine-level pixel data to a D/A converter 108. The D/A converter 108 converts the digital color data into an analog video signal, thereby outputting the digital data to an interlaced scanning monitor of a TV receiver.

Figure 9:
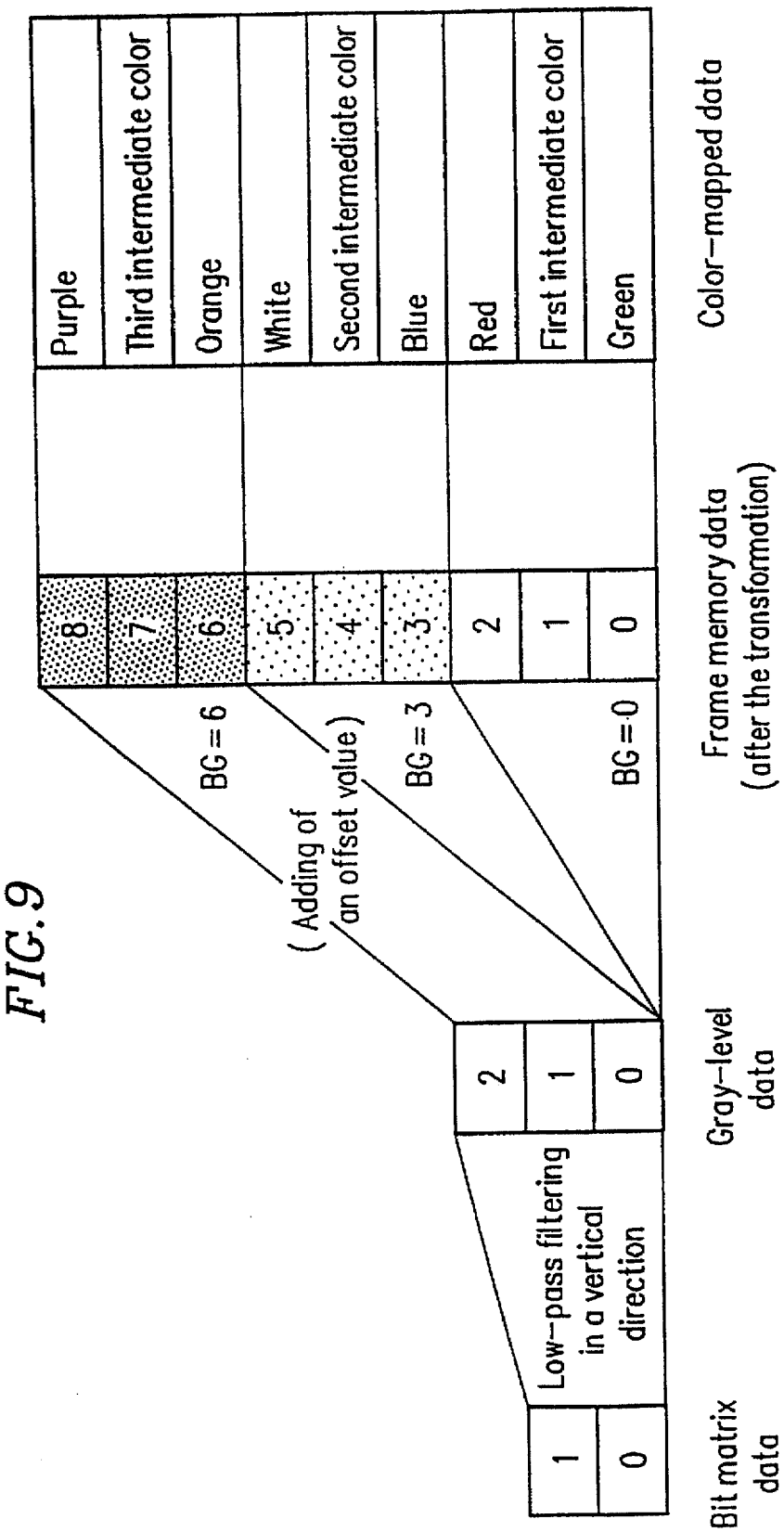
FIG. 9 is a view showing a method for transforming gray-level data into a color data by using a system shown in FIG. 8, and the color mapping relationship between the transformed data and the display colors.

As shown in FIG. 9, the gray-level data is mapped to plural sets of colors in accordance with the background color. In order to realize this relationship, a background data (BG) designating a background color of a character is added to the gray-level pixel data as an offset value. First, the CPU 101 executes the processing of above-mentioned Steps 201 through 204 as shown in the flow chart of FIG. 2. The gray-level data generating unit 104, e.g. a ROM, generates a gray-level data to be coded by three integers of "0", "1" and "2". Next, the data transform unit 801 adds the background data to the generated gray-level data as an offset value. In the embodiment shown in FIG. 9, three kinds of background data to be coded by the three integers of "0", "3" and "6" are added to the gray-level data to be coded by "0", "1" and "2" as offset values. As a result, the following three sets of pixel data are generated:

A pair with (BG=0): (transformed pixel data=0 to 2)

A pair with (BG=3): (transformed pixel data=3 to 5)
A pair with (BG=6): (transformed pixel data=6 to 8)

In this example, in place of executing Step 205 shown in FIG. 2, the CPU 101 reads the nine-level pixel data transformed by the data transform unit 801 and then writes the pixel data into the frame memory 105. In this case, the frame memory 105 is required to have a storage capacity of at least 4 bits per pixel to represent nine colors for each pixel. Step 206 shown in FIG. 2 is conducted also in this example for executing a similar processing to that mentioned above. As a result, the pixel data to be coded by the nine integers of "0" through "8" is stored in the frame memory 105.

The CPU 101 controls the color mapping unit 107 so that the nine-level pixel data stored in the frame memory 105 are mapped to the respective color data. As shown in FIG. 9, the colors are assigned as follows:

(pixel data=0 to 2):
  background color ("green");
  foreground color ("red"); and
  a first intermediate color
(pixel data=3 to 5):
  background color ("blue");
  foreground color ("white"); and
  a second intermediate color
(pixel data=6 to 8):
  background color ("orange");
  foreground color ("purple"); and
  a third intermediate color In this way, the data transform unit 801 transforms the three-level pixel data into the nine level pixel data, thereby enabling the display using a plurality of colors for a character with a reduced flicker. The number of colors which can be displayed at one time depends on the number of bits per pixel of the frame memory 105. Accordingly, if the number of bits per pixel of the frame memory 105 is increased and if four or more sets of colors, larger in number than that of this example, are employed, then a character may be displayed in more kinds of colors. To the contrary, only two sets of colors may be employed in order to reduce the storage capacity of the frame memory 105. It is to be noted that the kinds of colors to be used are not limited to those described above, but that arbitrary colors may be assigned to the sets of colors.

In this example, when the data is transformed by the data transform unit 801, the data corresponding to the background color of a character is added as an offset value. Alternatively, the data of the foreground color may be added as an offset value, so long as a method for mapping the gray-level (three-level) pixel data to plural sets of colors is employed. In addition, the method described in this example may also be applied to the processing of a binary FAX image. The same effects as those obtained in processing a character font may be attained in such a case, too. In this example, the data corresponding to the background color of a character is obtained as variables of an application program. Such variables can be stored in a random access memory (RAM), a read only memory (ROM), a hard disk or a buffer memory provided for storing the application program.

As described above, in this example, the vertical brightness transition may be reduced by displaying in multiple levels an image represented based on the binary data. Accordingly, a line flicker occurring when an image represented based on the binary data is displayed by using an interlaced scanning system may be reduced.

EXAMPLE 3

In Examples 1 and 2 described above with reference to FIGS. 1 and 8, the gray-level (three-level) pixel data is written into the frame memory 105 and then transformed into the color data by the color mapping unit 107. In this third example, the frame memory 105 stores the color data instead of the pixel data. Accordingly, the gray level data generated by the gray-level data generating unit 104 or by the data transform unit 801 is color-extended and then written into the frame memory 105.

Figure 10:
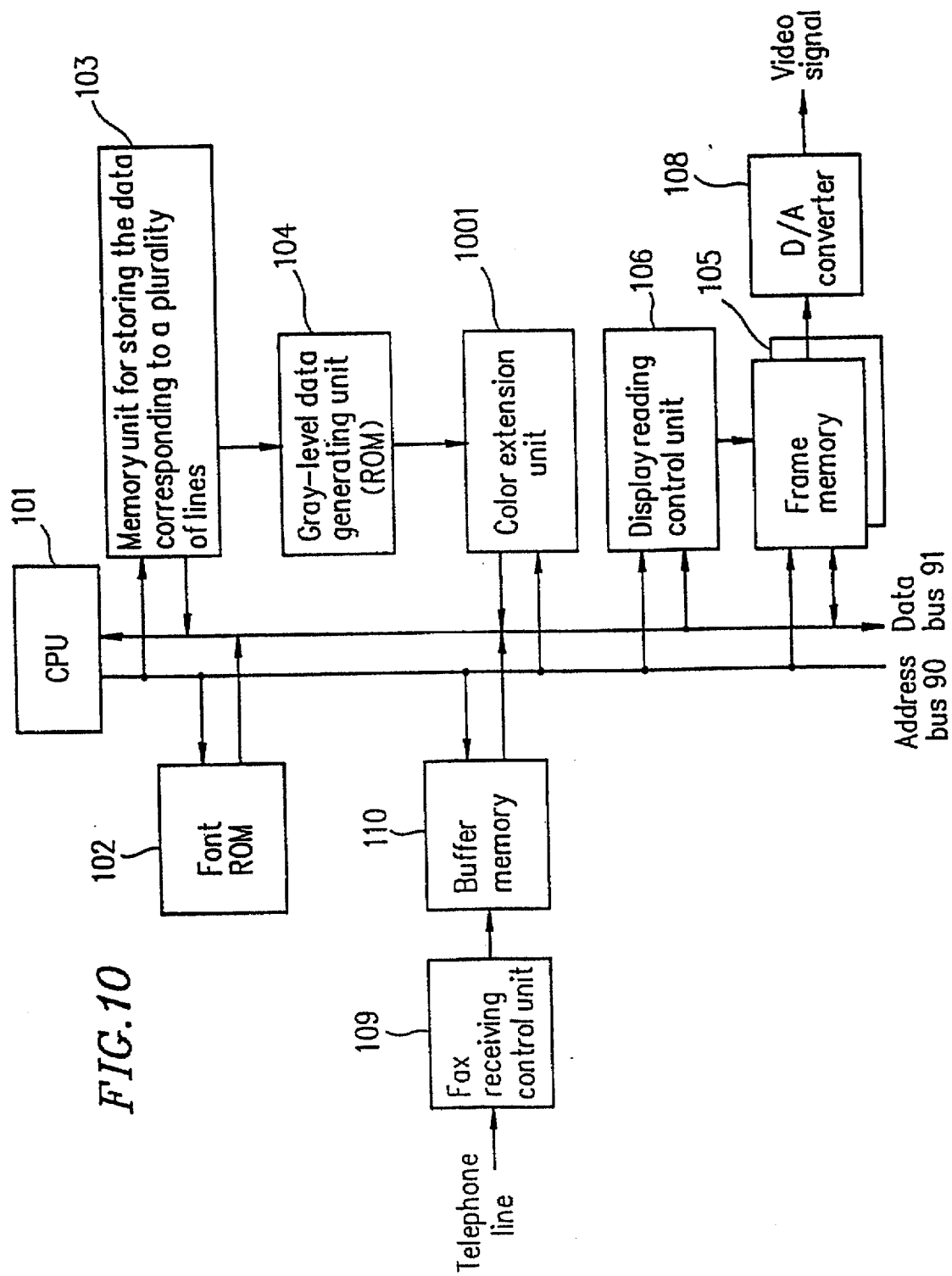
FIG. 10 is a block diagram for a system in which the gray-level data generated from binary data is color-extended, and then the color-extended data is written into a frame memory.
Figure 11:
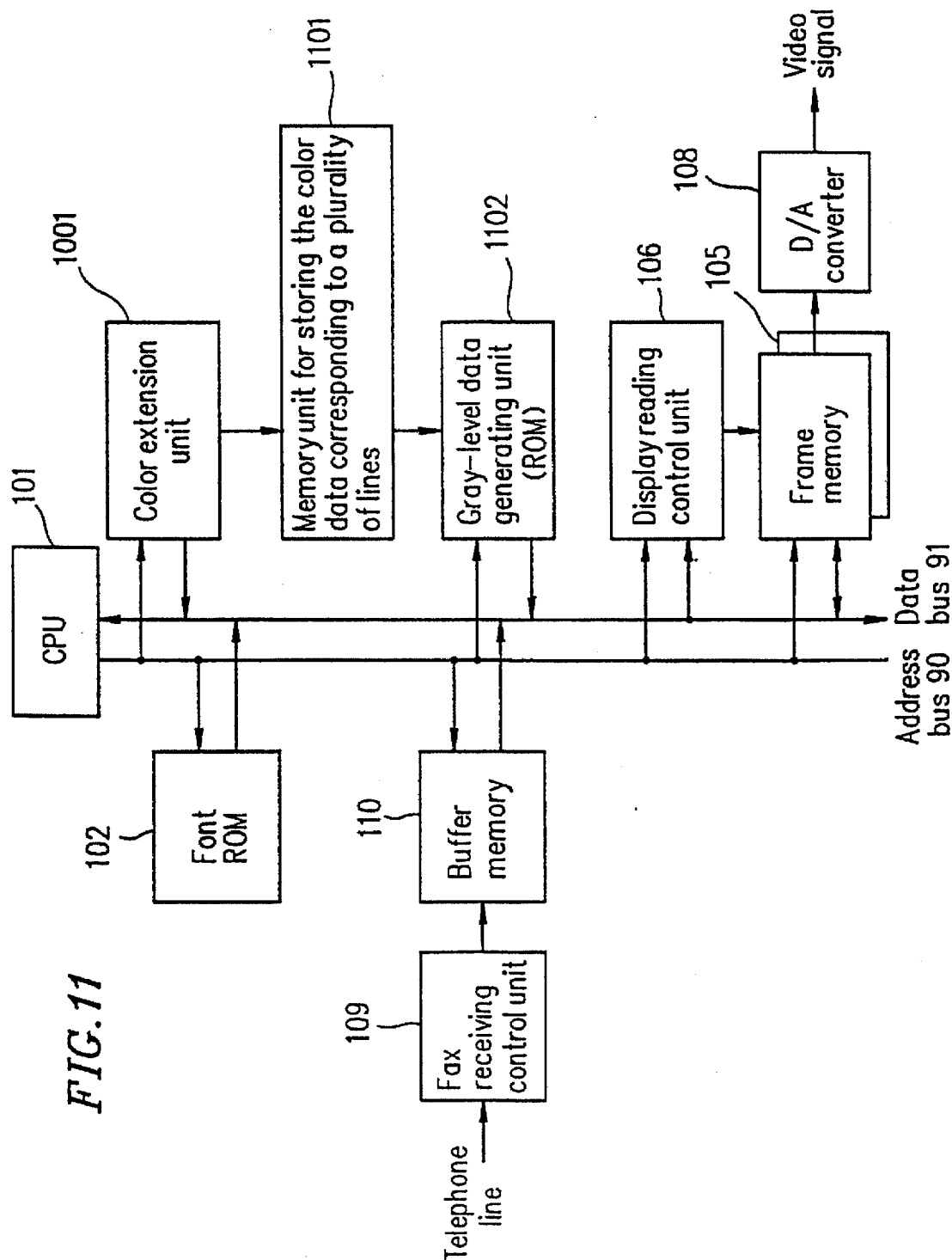
FIG. 11 is a block diagram for a system in which the binary data is color-extended, and then the color-extended data is subjected to a filtering operation.

FIG. 10 shows a block diagram of a gray level image display system according to the third example of the present invention. The color extension unit 1001 for transforming the gray-level pixel data into the color data has an equivalent function to that of the color mapping unit 107. However, the transform rate of this color extension unit 1001 is not required to be so high as the display reading rate of the color mapping unit 107. Since the output of the color extension unit 1001 is written into the frame memory 105 in this example, the data need not be transformed at real-time unlike the case of Example 1.

The CPU 101 executes the processing of Steps 201 through 204 as shown in the flow chart of FIG. 2. The gray-level data generating unit 104 generates a gray-level data to be coded by the three integers of "0", "1" and "2" as the output of the ROM in the same manner as that in Example 1. Next, the color extension unit 1001 transforms the generated gray-level (three-level) data into predetermined color data. In the embodiment shown in FIG. 3B, the pixel data "0" is transformed into a color data designating the background color; the pixel data "2" is transformed into a color data designating the foreground color; and the pixel data "1" is transformed into a color data designating the intermediate color. The transform processing in this case may be implemented at an arbitrary rate, so the transform processing may be implemented by using a software only. In this example, in place of executing Step 205 shown in FIG. 2, the CPU 101 reads the data transformed by the color extension unit 1001 and then writes the data into the frame memory 105. Thereafter, the same processing is conducted in Step 206. The color data is read out from the frame memory 105 by the display reading-control unit 106 by interlaced scanning. Then the color data is converted by the D/A converter 108 into an analog video signal so as to be output to an interlaced scanning display device, such as a CRT of a TV receiver. Since the frame memory 105 stores the color data in this example, the frame memory 105 is required to have a storage capacity of 24 bits per pixel (i.e. 8 bits for R, C and B, respectively) in the case of conducting a full color display, for example.

In the above-mentioned manner, in a system including a full color frame memory, the generated gray-level data is first color-extended into a color data for a full-color display. The color-extended color data for a full-color display is written into the frame memory. The vertical brightness transition may be reduced by displaying in multiple levels an image represented based on the binary data in this example, too. Accordingly, a line flicker occurring when an image represented based on the binary data is displayed by an interlaced scanning monitor device may be reduced.

EXAMPLE 4

In a gray-level image display method and system according to this fourth example of the present invention, the binary pixel data is first transformed into the color data corresponding to two predetermined character colors, i.e. a background color and a foreground color. This is generally called a "color extension". Thereafter, the color-extended color data is subjected to a low-pass filtering operation. FIG.

11 shows the construction of a display system according to this example of the present invention.

A memory unit 1101 for storing the color data corresponding to a plurality of lines stores the color-extended color data corresponding to two lines. In Example 1, etc., the binary pixel data is stored in the memory unit 103. In this example, the color data consisting of 24 bits per pixel is stored in the memory unit 1101. In other words, the memory unit 1101 for storing the color data corresponding to a plurality of lines differs from the memory unit 103 for storing the data corresponding to a plurality of lines in the number of bits per pixel of the data to be stored therein. The frame memory 105 stores the data consisting of 24 bits per pixel, i.e. 8 bits for R, G and B, respectively. The gray-level data generating unit 1102 conducts the low-pass filtering operation expressed by Equation (1) with respect to the color data, thereby generating a pixel data with a reduced vertical brightness transition.

The processing is conducted in the following flow. First, the CPU 101 sequentially reads from up to down the binary pixel data output from the font ROM 102 or from the buffer memory 110 so as to input the pixel data to the color extension unit 1001. The color extension unit 1001 color-extends the input binary data to the color data consisting of the predetermined two colors, i.e. the background color and the foreground color. The color-extended color data is stored sequentially to the memory unit 1001 for storing the data corresponding to a plurality of lines.

The gray-level data generating unit 1102 conducts the similar low-pass filtering operation to that of Example 1 with respect to the color data corresponding to two lines on a pixel basis. Since the color data stored in the memory unit 1101 for storing the color data corresponding to a plurality of lines is composed of 24 bits, the operation is conducted with respect to each of 24 bits, thereby generating a gray-level data with a reduced vertical brightness transition. The low-pass filtering operation may be implemented by a hardware. The operation results may be held in a ROM as a look-up table, although the necessary storage capacity becomes large in such a case. The CPU 101 reads the color data obtained by the filtering operation from the gray-level generating unit 1102 and then writes the data into the frame memory 105. Thereafter, the color data written in the frame memory 105 is read out by the display reading-control unit 106 by interlaced scanning. Then the color data output by the frame memory 105 is converted by the D/A converter 108 into an analog video signal so as to be output.

In conducting the low-pass filtering operation by using the gray-level data generating unit 1102, the filtering coefficients shown in FIGS. 5A through 5D may be employed in this example, too.

As described above, in the system including a full-color frame memory of this example, the color extension processing is implemented first, and then the low-pass filtering operation is conducted. According to the method of this example, the vertical brightness transition may be reduced by displaying in multiple levels an image represented based on the binary data. Therefore, a line flicker occurring when an image represented based on the binary data is displayed by an interlaced scanning monitor may be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A gray-level image display method for displaying an image represented by binary pixel data in multiple levels, comprising the steps of:

generating a gray-level pixel data by conducting an operation with respect to respective pixels of the binary pixel data by providing predetermined weighting factors for a data of a first pixel and for a data of a second pixel adjacent to the first pixel; and displaying an image represented by the gray-level pixel data, wherein the step of displaying the image represented by the gray-level pixel data comprises the steps of:

writing the gray-level pixel data into a frame memory;

mapping the gray-level pixel data read from the frame memory to a predetermined set of colors consisting of a foreground color, a background color and at least one intermediate color; and displaying the gray-level pixel data on a display of an interlaced scanning system based on the mapped set of colors.

2. A gray-level image display method according to claim 1, wherein in the step of generating the gray-level pixel data, the first pixel and the second pixel are adjacent to each other in a direction perpendicular to a scan line of the interlaced scanning system.

3. A gray-level image display method according to claim 2, wherein the step of generating the gray-level pixel data comprises the steps of:

storing the data of the first pixel into a first memory region of a memory means; and storing the data of the second pixel into the first memory region of the memory means, while storing the data of the first pixel to a second memory region of the memory means.

4. A gray-level image display method according to claim 1, wherein in the step of generating the gray-level pixel data, a plurality of pixels are adjacent to the first pixel; one of the plurality of pixels is adjacent to the first pixel in a direction perpendicular to a scan line of the interlaced scanning system; and the other of the plurality of pixels is adjacent to the first pixel in a direction parallel to the scan line.

5. A gray-level image display method according to claim 2, wherein the step of mapping the pixel data to the set of colors is a step of mapping the gray-level pixel data to the plural sets of colors.

6. A gray-level image display method according to claim 5, wherein the step of generating the gray-level pixel data comprises the steps of:

storing the data of the first pixel into a first memory region of a memory means; and storing the data of the second pixel into the first memory region of the memory means, while storing the data of the first pixel to a second memory region of the memory means.

7. A gray-level image display method according to claim 4, wherein the mapping step is a step of mapping the gray-level pixel data to the plural sets of colors.

8. A gray-level image display method for displaying an image represented by binary pixel data in multiple levels, comprising the steps of:

generating a gray-level pixel data by conducting an operation with respect to respective pixels of the binary pixel data by providing predetermined weighting factors for a data of a first pixel and for a data of a second pixel adjacent to the first pixel; and displaying an image represented by the gray-level pixel data, wherein the step of displaying the image represented by the gray-level pixel data comprises the steps of:

mapping the gray-level pixel data to a predetermined sets of colors consisting of a foreground color, a background color and at least one intermediate color;

writing a color data representing the mapped set of colors into a frame memory; and displaying the color data on a display of an interlaced scanning system.

9. A gray-level image display method for displaying an original image including a first pixel and a second pixel adjacent to the first pixel, the first pixel having a first binary pixel data, the second pixel having a second binary pixel data, comprising the steps of:

mapping the binary pixel data to a color data representing a predetermined background color and a predetermined foreground color;

generating a gray-level pixel data for the first pixel by conducting an operation with respect to a first color data of the first pixel and a second color data of the second pixel with predetermined weighting factors; and displaying an image represented by the gray-level pixel data corresponding to the original image.

10. A gray-level image display apparatus for displaying an image represented by binary pixel data, comprising:

a generating means for generating a gray-level pixel data by conducting an operation with respect to respective pixels of the binary pixel data by providing predetermined weighting factors for a data of a first pixel and for a data of a second pixel adjacent to the first pixel; and a display means for displaying an image represented by the gray-level pixel data, wherein the display means for displaying the image represented by the gray-level pixel data comprises:

a writing means for writing the gray-level pixel data into a frame memory; and a mapping means for mapping the gray-level pixel data read from the frame memory to a predetermined set of colors consisting of a foreground color, a background color and at least one intermediate color;

wherein the display means displays the gray-level pixel data on a display of an interlaced scanning system based on the mapped set of colors.

11. A gray-level image display apparatus according to claim 10, wherein the first pixel and the second pixel are adjacent to each other in a direction perpendicular to a scan line of the interlaced scanning system.

12. A gray-level image display apparatus according to claim 11, wherein the generating means for generating the gray-level pixel data comprises an FIFO (first-in first-out) type register for operation based on the data of the first pixel and the data of the second pixel.

13. A gray-level image display apparatus according to claim 10, wherein a plurality of pixels are adjacent to the first pixel; one of the plurality of pixels is adjacent to the first pixel in a direction perpendicular to a scan line of the interlaced scanning system; and the other of the plurality of pixels is adjacent to the first pixel in a direction parallel to the scan line.

14. A gray-level image display apparatus according to claim 11, wherein the mapping means maps the gray-level pixel data to the plural sets of colors.

15. A gray-level image display apparatus according to claim 14, wherein the generating means for generating the gray-level pixel data comprises an FIFO (first-in first-out) type register for operation based on the data of the first pixel and the data of the second pixel.

16. A gray-level image display apparatus according to claim 13, wherein the mapping means maps the gray-level pixel data to the plural sets of colors.

17. A gray-level image display apparatus for displaying an image represented by binary pixel data, comprising:

a generating means for generating a gray-level pixel data by conducting an operation with respect to respective pixels of the binary pixel data by providing predetermined weighting factors for a data of a first pixel and for a data of a second pixel adjacent to the first pixel; and a display means for displaying an image represented by the gray-level pixel data, wherein the display means for displaying the image represented by the gray-level pixel data comprises:

a mapping means for mapping the gray-level pixel data to a predetermined set of colors consisting of a foreground color, a background color and at least one intermediate color; and a writing means for writing the color data representing the mapped set of colors into a frame memory;

wherein the display means displays the color data on a display of an interlaced scanning system.

18. A gray-level image display apparatus for displaying an original image including a first pixel and a second pixel adjacent to the first pixel, the first pixel having a first binary pixel data, the second pixel having a second binary pixel data, comprising:

a mapping means for mapping the binary pixel data to a color data representing a predetermined background color and a predetermined foreground color;

a generating means for generating a gray-level pixel data for the first pixel by conducting an operation with respect to a first color data of the first pixel and a second color data of the second pixel with predetermined weighting factors; and a display means for displaying an image represented by the gray-level pixel data corresponding to the original image.

19. A gray-level image display method for displaying an original image including a first pixel and a second pixel adjacent to the first pixel, the first pixel having a first binary pixel data, the second pixel having a second binary pixel data, comprising the steps of:

generating a gray-level pixel data for the first pixel by conducting an operation with respect to the first binary pixel data of the first pixel and the second binary pixel data of the second pixel with predetermined weighting factors; and displaying an image represented by the gray-level pixel data corresponding to the original image, wherein the step of displaying the image represented by the gray-level pixel data corresponding to the original image comprises the steps of:

writing the gray-level pixel data into a frame memory;

mapping the gray-level pixel data read from the frame memory to a predetermined set of colors consisting of a foreground color, a background color and at least one intermediate color; and displaying the gray-level pixel data on a display of an interlaced scanning system based on the mapped set of colors.

20. A gray-level image display apparatus for displaying an original image including a first pixel and a second pixel adjacent to the first pixel, the first pixel having a first binary pixel data, the second pixel having a second binary pixel data comprising:

- a generating means for generating a gray-level pixel data for the first pixel by conducting an operation with respect to the first binary pixel data of the first pixel and the second binary pixel data of the second pixel with predetermined weighting factors; and
- a display means for displaying an image represented by the gray-level pixel data corresponding to the original image, wherein the display means for displaying the image represented by the gray-level pixel data corresponding to the original image comprises:

- a writing means for writing the gray-level pixel data into a frame memory; and
- a mapping means for mapping the gray-level pixel data read from the frame memory to a predetermined set of colors consisting of a foreground color, a background color and at least one intermediate color;

wherein the display means displays the gray-level pixel data on a display of an interlaced scanning system based on the mapped set of colors.

* * * * *